United States Patent
Tse

(10) Patent No.: US 7,017,753 B2
(45) Date of Patent: Mar. 28, 2006

(54) APPARATUS AND METHOD OF SEPARATING HEAVY MATERIALS IN GARBAGE FROM LIGHT ONES AND CLASSIFYING THE HEAVY GARBAGE FOR COLLECTION

(75) Inventor: Steven Tse, Room G08, Block 7, Kang Yuan, Guangzhou Country Garden, Dashi, Panyu, Guangzhou City, Guangdong, 511430 (CN)

(73) Assignee: Steven Tse, Guangzhou (CN)

( * ) Notice: Subject to any disclaimer, the term of this patent is extended or adjusted under 35 U.S.C. 154(b) by 223 days.

(21) Appl. No.: 10/436,112

(22) Filed: May 13, 2003

(65) Prior Publication Data

US 2004/0226866 A1 Nov. 18, 2004

(51) Int. Cl.
*B03B 5/64* (2006.01)

(52) U.S. Cl. ...................... 209/162; 209/173; 209/156; 209/218; 209/930; 209/680; 209/225

(58) Field of Classification Search ..................... None
See application file for complete search history.

(56) References Cited

U.S. PATENT DOCUMENTS

| 3,568,839 A | * | 3/1971 | Dunlea ........................ 210/194 |
| 3,817,458 A | * | 6/1974 | Gilberto ...................... 241/20 |
| 6,368,500 B1 | * | 4/2002 | Asa et al. ................... 210/173 |

* cited by examiner

*Primary Examiner*—Donald Wilson
*Assistant Examiner*—Jonathan R. Miller
(74) *Attorney, Agent, or Firm*—Ware, Fressola, Van Der Sluys & Adolphson LLP

(57) ABSTRACT

An apparatus and method of separating heavy materials in garbage from light ones is taking advantage of water as a means for carrying floated garbage and submerged garbage and sinking the heavy materials in garbage by considering specific weight, buoyancy, and flow rate of water so as to remove the light materials in garbage and the heavy materials in garbage from the water container at different elevations and then to classify the heavy materials in garbage prior to collection.

9 Claims, 4 Drawing Sheets

STEP 1 :

WATER IS USED AS MEANS FOR CARRYING FLOATED GARBAGE AND SUBMERGED GARBAGE AND SINKING HEAVY GARBAGE

STEP 2 :

LIGHT GARBAGE AND HEAVY GARBAGE ARE REMOVED FROM WATER MEANS

STEP 3 :

HEAVY GARBAGE IS FURTHER CLASSIFIED PRIOR TO COLLECTION

APPARATUS AND METHOD OF SEPARATING HEAVY MATERIALS IN GARBAGE FROM LIGHT ONES AND CLASSIFYING THE HEAVY GARBAGE FOR COLLECTION

BACKGROUND OF THE INVENTION

1. Field of the Invention

The present invention relates to garbage disposal and more particularly to an efficient apparatus and method of separating heavy materials in garbage from light ones and classifying the heavy garbage for collection.

2. Description of Related Art

As to garbage disposal, typically there are techniques, i.e., landfill and burning, widely used throughout the world. Many precious lands are used for landfill as more garbage is generated everyday. Underground water and soil may be polluted by buried garbage if an appropriate disposal is not done. As to burning, it can cause severe air pollution if smoke generated during burning is not well processed prior to discharge. As to generated ashes, they are buried after being generated. Hence, the problem of polluting underground water and soil still exists. Further, it is often that residents violently protest a garbage disposal site to be established in their neighborhood because they think it may degrade their living quality once established. Furthermore, the cost of disposing garbage is increased significantly as less land being available for landfill.

Resources on earth begin to deplete in recent years. Hence, more and more people are aware of the importance of resource recycling by actively cooperating with the resource recycling policy. It is desired that amount of garbage can be reduced significantly in a near future by successfully recycling resources in order to prolong a useful time of land for burying garbage and preserve limited resources on earth. However, the typical resource recycling (i.e., garbage recycling) techniques are unsatisfactory now. For example, a satisfactory garbage classification is not possible by the typical resource recycling techniques mainly because a wide variety of different materials are contained in garbage. The materials comprise toxic, nontoxic, large, small, dry, wet, soft, hard, light, and heavy ones. Hence, an effective classification among such materials is impossible by a known mechanical device. More often that a manual garbage classification is done. For example, encourage people to classify garbage or require cleaning employees to do the garbage classification after collection. In view of the above, the conventional garbage classification technique is tedious and low in efficiency. Moreover, the cleaning employees are susceptible of contracting diseases or being poisoned by contaminants or toxic materials contained in garbage. Hence, a need for improvement exists.

Thus, it is desirable to provide a novel apparatus and method of separating heavy materials in garbage from light ones by means of water and further classifying the heavy garbage for collection in order to overcome the above drawbacks of the prior art.

SUMMARY OF THE INVENTION

It is an object of the present invention to provide an apparatus and method of separating heavy materials in garbage from light ones and further classifying the heavy garbage for collection.

It is another object of the present invention to provide a method of separating heavy materials in garbage from light ones while performing an initial cleaning.

It is still another object of the present invention to provide a method of separating heavy materials in garbage from light ones while diluting toxic materials in garbage.

It is yet another object of the present invention to provide a method of separating heavy materials in garbage from light ones by substantially maintaining an intactness of garbage for preventing toxic materials in garbage from leaking and thus from causing a catastrophic pollution.

It is a further object of the present invention to provide an automatic apparatus capable of effectively separating heavy materials in garbage from light ones and further classify the heavy garbage while performing an initial cleaning and a dilution of toxic materials.

To attain the above mentioned objects and functions, the method of separating heavy materials in garbage from light materials in garbage and classifying the heavy materials in garbage for collection, comprising the steps of:

taking advantage of water as a means for carrying floated garbage and submerged garbage and sinking the heavy materials in garbage wherein garbage is poured into a water container containing water and a whirling flow is formed in the water container by spraying water, so that the light materials in garbage are flushed by the whirling flow to float on or submerge in water due to a smaller specific weight thereof as compared to that of water, the heavy materials in garbage are sunk to a bottom of the water container due to a larger specific weight thereof as compared to that of water, and the light materials in garbage and the heavy materials in garbage are at different elevations in the water container;

removing the light materials in garbage and the heavy materials in garbage from the water container wherein the light materials in garbage and the heavy materials in garbage at different elevations in the water container are continuously removed respectively so as to separate the heavy materials in garbage from the light materials in garbage; and classifying the heavy materials in garbage prior to collection wherein a separation of different types of the heavy materials in garbage based on size, metal, and non-metal is performed to classify the heavy materials in garbage for respectively collecting.

Preferably, the light materials in garbage comprise floated garbage and submerged garbage.

Preferably, water is sprayed obliquely in a jet toward water in the water container so as to form the whirling flow in the water container.

Preferably, the step of classifying the heavy materials in garbage prior to collection comprises the sub-steps of:

separating different types of the heavy materials in garbage by passing through a screen mechanism having a plurality of meshed openings of different sizes to sift out different sized articles in the heavy materials in garbage for collection;

activating a magnetic conveyor to attract metal articles in the heavy materials in garbage for collection; and collecting remained large non-metal articles in the heavy materials in garbage.

Preferably, the apparatus of separating heavy materials in garbage from light materials in garbage and classifying the heavy materials in garbage for collection, comprising:

a substantially parallelepiped water container containing water and including a top inlet opening for garbage feeding, a plurality of inclined division means disposed partially in the water container, a top edge of the first division means being proximate the inlet opening, an inverted cone-shaped flushing pool defined by the division means, a plurality of rows of sand openings on a surface of the first division means for permitting sand to pass through, a plurality of injection nozzles at the first division means for obliquely spraying water to the flushing pool, and a light garbage outlet opening opposite to the first division means, a front bottom edge of the light garbage outlet opening being always kept at the same elevation as surface of water in the water container;

a heavy garbage inlet at a lowest portion of the flushing pool being in fluid communication with the flushing pool and the water container;

a heavy garbage conveyor obliquely extended from outside the water container into a position adjacent the heavy garbage inlet, the heavy garbage conveyor being driven for carrying heavy garbage out of the water container; and a heavy garbage separation mechanism coupled to the heavy garbage conveyor.

Preferably, the heavy garbage separation mechanism is disposed outside the water container and comprises a horizontal conveyor disposed below and spaced apart from the heavy garbage conveyor, a magnetic conveyor above the horizontal conveyor, the magnetic conveyor being disposed further away from the heavy garbage conveyor as compared with the horizontal conveyor, the magnetic conveyor being adapted to magnetically attract the heavy materials in garbage, a magnetic garbage collection vessel below the magnetic conveyor, the magnetic garbage collection vessel being disposed further away from the heavy garbage conveyor as compared with the magnetic conveyor, the magnetic garbage collection vessel being adapted to magnetically attracting the heavy materials in garbage for collection by producing a stronger magnetic field, a slanted sieve below the horizontal conveyor, the sieve having a plurality of meshed openings, a small heavy garbage collection vessel below the sieve, and a large heavy garbage collection vessel below the sieve but spaced apart from the small heavy garbage collection vessel.

The above and other objects, features and advantages of the present invention will become apparent from the following detailed description taken with the accompanying drawings.

DETAILED DESCRIPTION OF THE PREFERRED EMBODIMENTS

Figure 1:
FIG. 1 is a flow chart showing a sequence of method steps performed by an apparatus according to the invention.
Figure 1:

Referring to FIG. 1, there is shown a sequence of method steps performed by an apparatus of separating heavy materials in garbage from light ones and further classifying the heavy garbage for collection in accordance with the invention.

In step 1, water is used as means for carrying floated and submerged garbage and sinking heavy garbage. In detail, pour garbage into a water container containing water. Water is sprayed from a plurality of injection nozzles toward a bottom of an inclined division board in the water container so as to form a whirling flow in the water container. Hence light materials in garbage are flushed by the whirling flow to float on water in the water container. Such light materials (e.g., plastic bottles, papers, etc.) are floated because their specific weight is less than that of water. Also, some materials such as fruits, cloth products capable of absorbing water (e.g., diapers) are submerged in water.

The submerged garbage has more or less buoyancy. By taking advantage of the float characteristic of the submerged garbage, the invention continues to obliquely spray water toward the submerged garbage for maintaining its submerged state. As to heavy materials in garbage having a specific weight larger than that of water, they will sink to the bottom of the water container. In a preferred embodiment of the invention, a slanted division board is provided to guide the sunk heavy garbage by sliding along the division board down to a desired position for collection. As such, an accumulation of the heavy garbage in the water container is avoided. As an end, the light garbage and the heavy garbage are at different elevations in the water container.

In step 2, light garbage and heavy garbage are removed from the water container. In detail, continuously remove the light garbage including floated garbage and submerged garbage from water and transport same to a next garbage disposal apparatus by a conveyor. Note that the next garbage disposal apparatus is not pertinent to the invention. Thus a detailed description thereof is omitted herein for the sake of brevity. The heavy garbage sunk in the bottom of the water container is also removed from the water container by a heavy garbage conveyor. As an end, the purpose of removing separated light garbage and heavy garbage is achieved.

In step 3, heavy garbage is further classified prior to collection. That is, separate different types (e.g., different sized articles, metal articles, and non-metal articles) of heavy garbage by passing through a sieve or by means of a magnetic conveyor. In detail, first pass heavy garbage through a screen mechanism having a plurality of meshed openings of different sizes to sift out different sized articles for collection. Next, activate the magnetic conveyor to attract metal articles for collection. Finally, the remained large non-metal articles are collected. As an end, the purpose of further classifying heavy garbage for respectively collecting is achieved.

Figure 2:
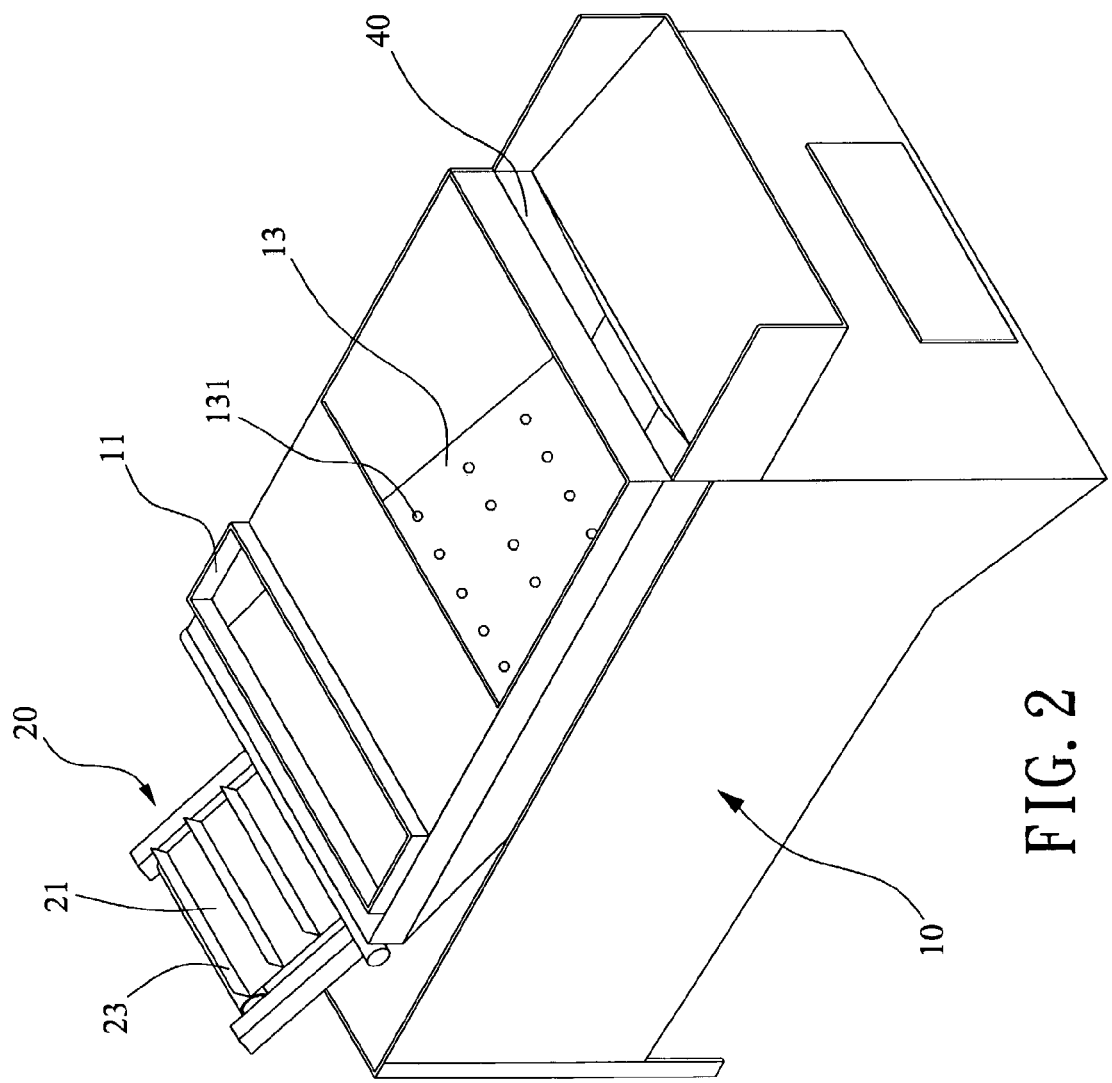
FIG. 2 is a perspective view of a preferred embodiment of the apparatus.
Figure 3:
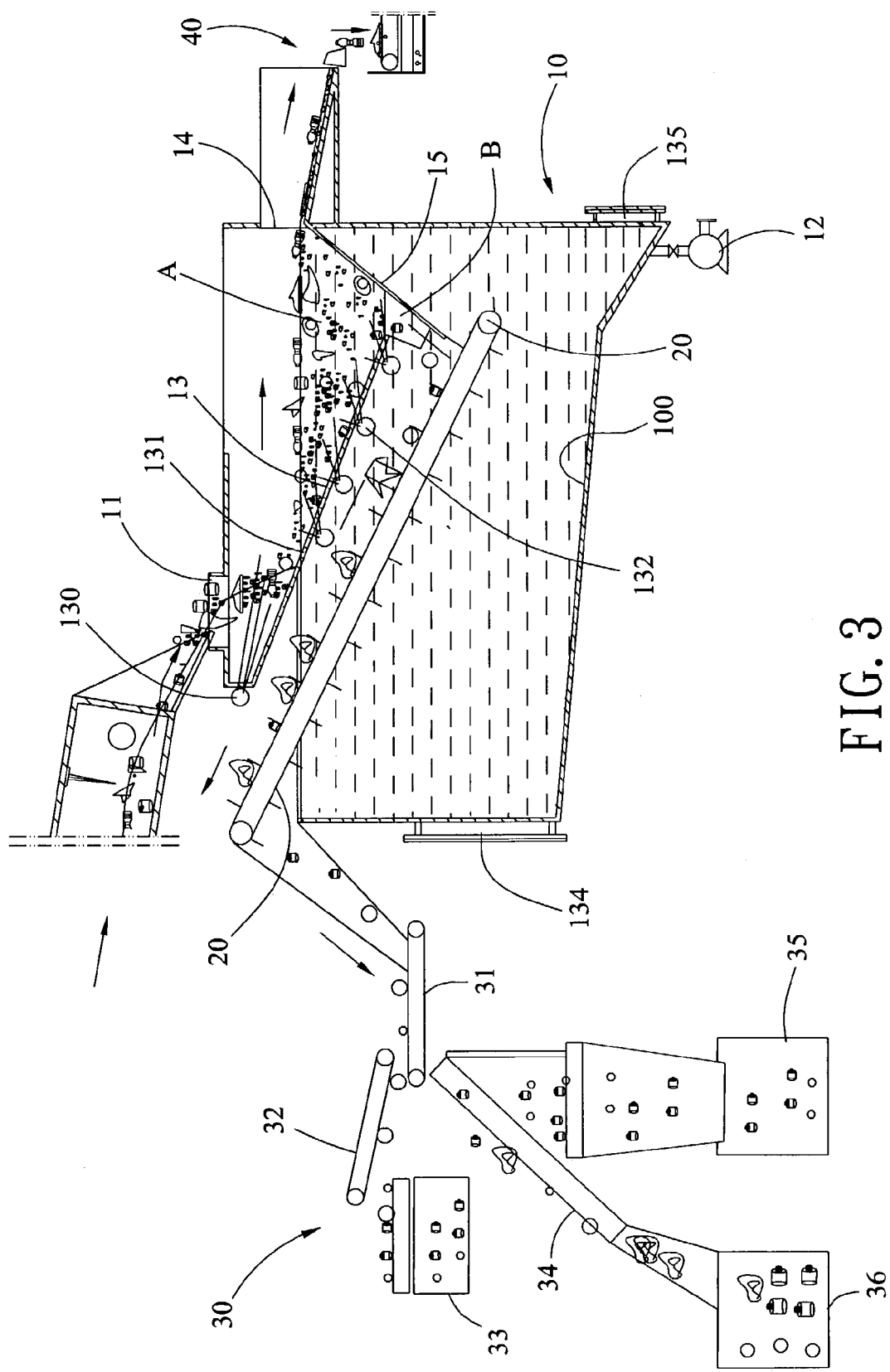
FIG. 3 is a cross-sectional view schematically illustrating the garbage disposal flow performed by the apparatus according to the invention.

Referring to FIGS. 2 and 3, there is shown a perspective view of a preferred embodiment of the apparatus of separating heavy materials in garbage from light ones and classifying the heavy garbage for collection. The apparatus comprises a substantially parallelepiped water container 10 including a top inlet opening 11 for feeding garbage from a previous garbage disposal stage, an inclined bottom 100, a pump 12 at a lowest position of the inclined bottom 100 for drawing mud out of the water container 10, an internal inclined first division board 13 extended from above surface of water in the water container 10 into water therein, a top edge of the first division board 13 being proximate the inlet opening 11, and a first injection nozzle 130 at the top edge of the first division board 13 for spraying water along the surface of the first division board 13.

As shown in FIG. 3, a light garbage outlet opening 14 is provided at a rear side of the water container 10 aligned with the first division board 13. A front bottom edge of the light garbage outlet opening 14 is always kept at the same elevation as the surface of water in the water container 10. A light garbage conveyor 40 is provided outside the light garbage outlet opening 14. An inclined second division board 15 is extended downward from the front bottom edge of the light garbage outlet opening 14 into water in the water container 10 proximate and being angled with respect to the first division board 13. Thus, a flushing pool A is defined by the first and second division boards 13, 15 and a heavy garbage inlet B is formed between a lower end of the first division board 13 and a lower portion of the second division board 15.

Referring to FIGS. 2 and 3 again, a plurality of rows of sand openings 131 are formed on a bottom of the first division board 13 for permitting sand to pass through. A plurality of second injection nozzles 132 are provided below the sand openings 131, i.e., spaced from the flushing pool A by the first division board 13. Water sprayed from the second injection nozzles 132 is at an angle with respect to a horizontal line to hit the flushing pool A via the sand openings 131. Also, the angle of each second injection nozzle 132 and the strength of water sprayed therefrom are adjustable.

Figure 4:
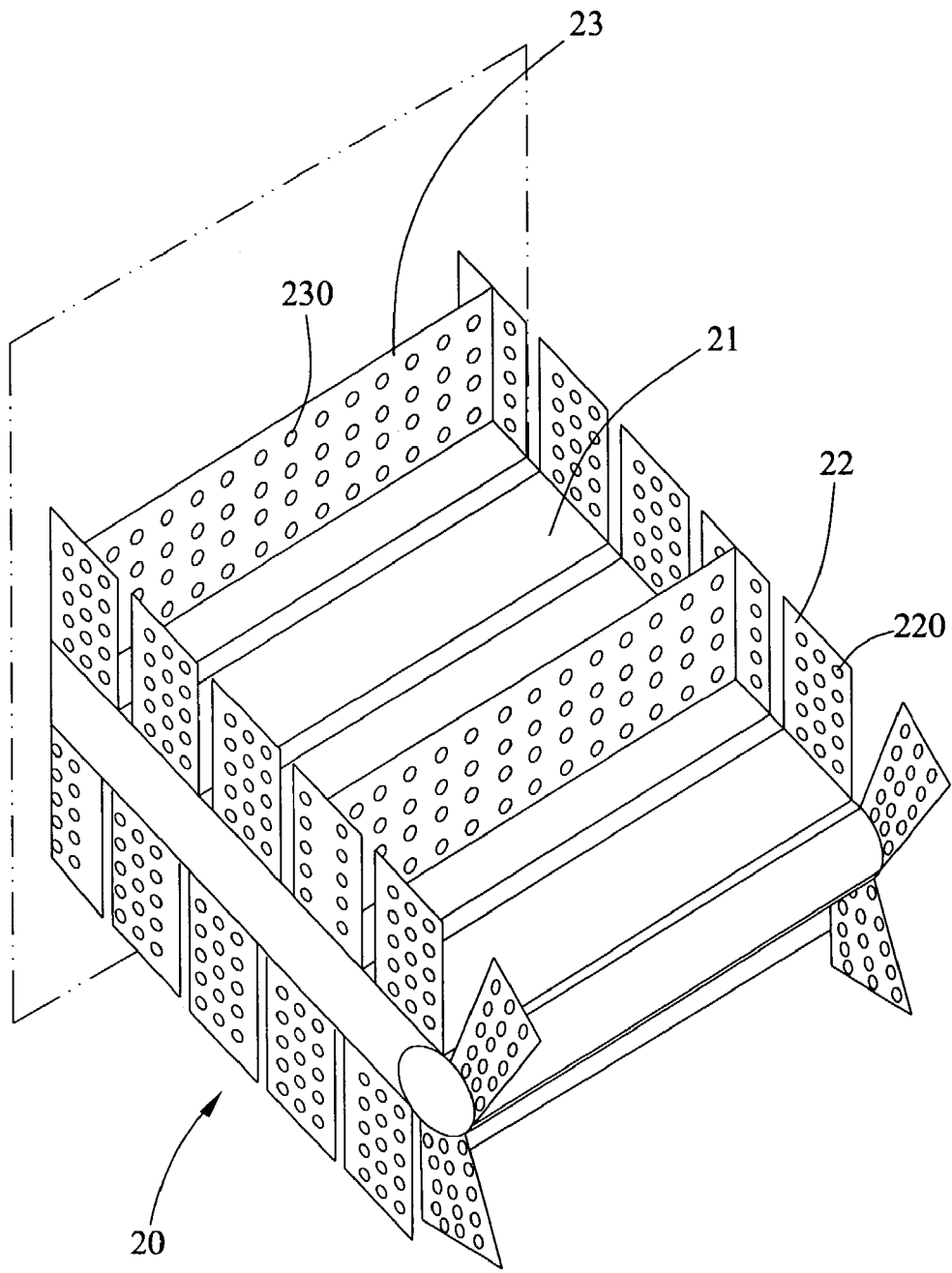
FIG. 4 is an enlarged perspective view of heavy garbage separation mechanism of the apparatus.

Referring to FIG. 4 in conjunction with FIGS. 2 and 3, a heavy garbage conveyor 20 is obliquely extended from outside the water container 10 into water therein. The heavy garbage conveyor 20 is substantially parallel to the first division board 13. A bottom side of the heavy garbage conveyor 20 is below the heavy garbage inlet B. The heavy garbage conveyor 20 comprises a plurality of rectangular plate members 21 joined together to form an endless transfer belt being driven by a motor (not shown) for carrying garbage to a desired location as detailed later, two rectangular wall plates 22 at both sides of each plate member 21, the wall plate 22 being substantially perpendicular to the coupled plate member 21 and including a plurality of water openings 220, and a plurality of transverse division plates 23 each interconnected between about center lines of the opposite wall plates 22 via a center line of the plate member 21, the transverse division plate 23 being substantially perpendicular to each of the coupled plate member 21 and the wall plates 22. The heavy garbage conveyor 20 is thus constructed. A heavy garbage separation mechanism 30 is formed adjacent a top side of the heavy garbage conveyor 20 outside the water container 10.

Referring to FIGS. 2 and 3 again, an operation of the invention will now be described in detail below. First, pour garbage into the inlet opening 11 of the water container 10. Next, garbage is slid along the inclined surface of the first division board 13 down to the flushing pool A by activating the first injection nozzle 130 to obliquely spray water toward garbage. At the same time, the second injection nozzles 132 are also activated to spray water toward garbage. Note that both the angle of each second injection nozzle 132 and the strength of water sprayed therefrom are adjustable depending on materials in garbage. For example, garbage collected in the country may be sandy. Hence, the speed of sprayed water has to lower. Otherwise, sand may be pushed by strong sprayed water to hit and adhere to heavy garbage, resulting in a hindrance of garbage classification. Preferably, sprayed water forms a whirling flow in the flushing pool A. As such, light materials are flushed by the whirling flow to float on water in the flushing pool A. Such light materials (e.g., plastic bottles, papers, etc.) are floated because their specific weight is less than that of water. Also, some materials such as fruits, cloth products capable of absorbing water (e.g., diapers) are submerged in the flushing pool A. The submersion of the submerged garbage is maintained by continuing sprayed water from the first injection nozzle 130. Also, both the floated garbage and the submerged garbage are pushed forward by water flow toward the light garbage outlet opening 14 for discharging out of the water container 10. The discharged garbage is further conveyed to a next garbage disposal stage by the light garbage conveyor 40.

Referring to FIGS. 2 and 3 again, heavy garbage has a specific weight larger than that of water. Hence, a portion of the heavy garbage will sink along the first division board 13 to the bottom of the flushing pool A. As a result, an accumulation of the heavy garbage in the water container 10 is avoided. Further, the other portion of heavy garbage will sink along the second division board 15. Next, the heavy garbage is fallen on the heavy garbage conveyor 20 through the heavy garbage inlet B. Eventually, the heavy garbage is carried upward along the transfer belt defined by the plate members 21, the wall plates 22, and the transverse division plates 23 to the heavy garbage separation mechanism 30 outside the water container 10 for further classification.

Referring to FIG. 3 again, the heavy garbage separation mechanism 30 comprises a horizontal conveyor 31 coupled to the heavy garbage conveyor 20 and disposed below and spaced apart from the heavy garbage conveyor 20, a magnetic conveyor 32 above the horizontal conveyor 31, the magnetic conveyor 32 being disposed further away from the heavy garbage conveyor 20 as compared with the horizontal conveyor 31, the magnetic conveyor 32 being adapted to magnetically attract the heavy garbage, a magnetic garbage collection vessel 33 below the magnetic conveyor 32, the magnetic garbage collection vessel 33 being disposed further away from the heavy garbage conveyor 20 as compared with the magnetic conveyor 32, the magnetic garbage collection vessel 33 being adapted to magnetically attracting the heavy garbage by producing a stronger magnetic field, a slanted sieve 34 below both the horizontal conveyor 31 and the magnetic conveyor 32, each meshed opening of the sieve 34 being adapted to permit, for example, an AA 1.5V cell to pass through, a small heavy garbage collection vessel 35 below the sieve 34, and a large heavy garbage collection vessel 36 also below the sieve 34 but spaced apart from the small heavy garbage collection vessel 35.

In operation, the heavy garbage discharged from the heavy garbage conveyor 20 is dropped onto the horizontal conveyor 31. Next, the heavy garbage conveyor 20 transfers the heavy garbage toward the magnetic conveyor 32 and the sieve 34 in which the magnetic conveyor 32 is activated to attract metal articles in the heavy garbage. Further, the metal articles are attracted by the stronger magnetic field produced by the magnetic garbage collection vessel 33 for collection. As to other remained articles on the horizontal conveyor 31, they will drop onto the sieve 34 after passing the end of the horizontal conveyor 31. The remained small heavy garbage will fall onto the small heavy garbage collection vessel 35 for collection through the openings of the sieve 34. As to other remained articles in the sieve 34, they will drop onto the large heavy garbage collection vessel 36 for collection after passing the end of the sieve 34. As an end, the purpose of separating heavy materials in garbage from light ones and further classifying the heavy garbage for respectively collecting is achieved.

The benefits of the invention include (1) providing a novel and unique garbage disposal implementation of rapidly, effectively, conveniently, and precisely separating heavy materials in garbage from light ones by means of water without involving a manual operation; (2) performing an initial cleaning of garbage by means of water while classifying garbage for facilitating a subsequent garbage recycling; (3) diluting toxic materials in garbage by means of water while classifying garbage for reducing a possibility of contracting diseases; (4) by taking advantage of the fact that articles may float, submerge, or sink in water due to different specific weights thereof, separating heavy materials in garbage from light ones and substantially maintaining an intactness of garbage for preventing toxic materials (e.g., insecticide bottles, pesticide bottles, etc.) in garbage from leaking and thus from causing a catastrophic pollution; and (5) providing an automatic apparatus capable of effectively, rapidly, and precisely classifying heavy garbage.

While the invention herein disclosed has been described by means of specific embodiments, numerous modifications and variations could be made thereto by those skilled in the art without departing from the scope and spirit of the invention set forth in the claims.

What is claimed is:

1. A method of separating heavy materials in garbage from light materials in garbage and classifying the heavy materials in garbage for collection, comprising the steps of:
    taking advantage of water as a means for carrying floated garbage and submerged garbage and sinking the heavy materials in garbage at different elevations in the water container having a water surface level;
    removing the light materials in garbage and the heavy materials in garbage from the water container wherein the light materials in garbage and the heavy materials in garbage at different elevations in the water container are continuously removed respectively so as to separate the heavy materials in garbage from the light materials in garbage, and wherein the water container has an outlet opening positioned partially above the water surface level so as to allow floated garbage to move through the outlet opening; and
    classifying the heavy materials in garbage prior to collection wherein a separation of different types of the heavy materials in garbage based on size, metal, and non-metal is performed to classify the heavy materials in garbage for respectively collecting, wherein the step of classifying the heavy materials in garbage prior to collection comprises the sub-steps of:
    separating different types of the heavy materials in garbage by passing through a screen mechanism having a plurality of meshed openings of different sizes to sift out different sized articles in the heavy materials in garbage for collection;
    activating a magnetic conveyor to attract metal articles in the heavy materials in garbage for collection; and
    collecting remained large non-metal articles in the heavy materials in garbage, and wherein the meshed openings of the screen mechanism are adapted to permit an AA 1.5V cell to pass through so as to collect the cells as the heavy materials in garbage pass through the screen mechanism.

2. The method of claim 1, wherein the light materials in garbage comprise floated garbage and submerged garbage, and wherein garbage is poured into a water container containing water and a whirling flow is formed in the water container by spraying water, so that the light materials in garbage are flushed by the whirling flow to float on or submerge in water due to a smaller specific weight thereof as compared to that of water, the heavy materials in garbage are sunk to a bottom of the water container due to a larger specific weight thereof as compared to that of water, and the light materials in garbage and the heavy materials in garbage.

3. The method of claim 1, wherein water is sprayed obliquely in a jet toward water in the water container so as to form the whirling flow in the water container.

4. An apparatus of separating heavy materials in garbage from light materials in garbage and classifying the heavy materials in garbage for collection, comprising:
    a water container containing water having a water surface level and including a top inlet opening for garbage feeding;
    an inclined first division means extended from above surface of water in the water container into water therein, a top edge of the first division means being proximate the inlet opening, and a first injection nozzle at the top edge of the first division means for spraying water along the surface of the first division means;
    a light garbage outlet opening provided at one side of the water container aligned with the first division means, the outlet opening positioned partially above the water surface level to allow floated garbage to enter the outlet opening for removal, the outlet opening having a front bottom edge;
    an inclined second division means extended downward from the front bottom edge of the light garbage outlet opening into water in the water container proximate and being angled with respect to the first division means;
    a flushing pool defined by the first and second division means;
    a heavy garbage inlet formed between a lower end of the first division means and a lower portion of the second division means being in fluid communication with the flushing pool and the water container;
    a heavy garbage conveyor obliquely extended from outside the water container into a position adjacent the heavy garbage inlet, the heavy garbage conveyor being driven for carrying heavy garbage out of the water container; and
    a heavy garbage separation mechanism coupled to the heavy garbage conveyor, wherein the heavy garbage separation mechanism is disposed outside the water container and comprises a horizontal conveyor disposed below and spaced apart from the heavy garbage conveyor, a magnetic conveyor above the horizontal conveyor, the magnetic conveyor being disposed further away from the heavy garbage conveyor as compared with the horizontal conveyor, the magnetic conveyor being adapted to magnetically attract magnetically attracting materials in garbage, a magnetic garbage collection vessel below the magnetic conveyor, the magnetic garbage collection vessel being disposed further away from the heavy garbage conveyor as compared with the magnetic conveyor, the magnetic garbage collection vessel being adapted to magnetically attract the magnetically attracting materials in garbage for collection by producing a stronger magnetic field, wherein a slanted sieve is disposed below the horizontal conveyor, the sieve having a plurality of meshed openings of a pre-determined size so as to allow the heavy materials falling onto the sieve that are smaller than the pre-determined size to pass through the meshed openings into a small garbage collection vessel below, and to allow the heavy materials larger than the pre-determined sized to be collected in another collection vessel.

5. The apparatus of claim 4, wherein the meshed openings of the sieve are adapted to permit an AA 1.5V cell to pass through so as to collect the cells as the heavy materials in garbage pass through the sieve.

6. The apparatus of claim 4, wherein the heavy garbage conveyor comprises a plurality of rectangular plate members joined together, two rectangular wall plates at both sides of each plate member, the wall plate being substantially perpendicular to the coupled plate member and including a plurality of water openings, and a plurality of transverse division plates each interconnected between the opposite wall plates via the plate member for forming an endless transfer belt for carrying heavy garbage out of the water container.

7. The apparatus of claim 4, wherein an angle of the injection nozzle at the first division means being adjustable in obliquely spraying water to the flushing pool so as to form the whirling flow in the water container.

8. The apparatus of claim 4, further comprising a light garbage conveyor outside the light garbage outlet opening for carrying light garbage out of the flushing spool for a subsequent garbage disposal.

9. The apparatus of claim 4, wherein a bottom of the water container is inclined, and further comprising a pump at a lowest position of the inclined bottom of the water container for drawing mud out of the water container.

* * * * *